United States Patent
Cha

(10) Patent No.: US 9,217,488 B2
(45) Date of Patent: Dec. 22, 2015

(54) HYDRO BUSH

(71) Applicant: HYUNDAI MOBIS CO., LTD., Seoul (KR)

(72) Inventor: Seung Hwan Cha, Yongin-si (KR)

(73) Assignee: HYUNDAI MOBIS, CO., LTD., Seoul (KR)

( * ) Notice: Subject to any disclaimer, the term of this patent is extended or adjusted under 35 U.S.C. 154(b) by 0 days.

(21) Appl. No.: 14/222,429

(22) Filed: Mar. 21, 2014

(65) Prior Publication Data

US 2014/0333018 A1  Nov. 13, 2014

(30) Foreign Application Priority Data

May 10, 2013 (KR) .................. 10-2013-0053352

(51) Int. Cl.
*F16F 13/14* (2006.01)
*B60G 7/02* (2006.01)

(52) U.S. Cl.
CPC .............. *F16F 13/1463* (2013.01); *B60G 7/02* (2013.01); *B60G 2204/143* (2013.01); *B60G 2204/41* (2013.01); *B60G 2204/41062* (2013.01)

(58) Field of Classification Search
CPC ........ B60G 15/06; B60G 15/08; B60G 13/08; B60G 11/26; B60G 11/265; B60G 2204/41062; F16F 13/1481; F16F 13/1463
See application file for complete search history.

(56) References Cited

U.S. PATENT DOCUMENTS

| 4,919,401 | A | | 4/1990 | Yano |
| 5,280,885 | A | * | 1/1994 | Noguchi .................. 267/140.12 |
| 5,496,018 | A | * | 3/1996 | McLelland et al. ...... 267/140.12 |

FOREIGN PATENT DOCUMENTS

| DE | 3631620 | A | * | 3/1987 |
| JP | 01-220736 | A | | 9/1989 |
| JP | 06-042577 | A | | 2/1994 |
| KR | 10-0974593 | B1 | | 8/2010 |

* cited by examiner

*Primary Examiner* — Anna Momper
(74) *Attorney, Agent, or Firm* — Knobbe Martens Olson & Bear LLP

(57) ABSTRACT

A hydro bush includes an outer pipe, an inner pipe, a rubber portion that is installed between the outer pipe and the inner pipe, and stoppers that are installed at both side ends. The hydro bush further includes a liquid chamber which is formed between the outer pipe and the rubber portion, and filled with a working fluid; and a flow path which is formed between the outer pipe and the rubber portion, and connected to the liquid chamber so as to guide the working fluid when the working fluid flows, in which the flow path includes a protruding portion which is formed to protrude inward. Accordingly, a flow distance of a working fluid flowing along the flow path may be increased without increasing a size of the hydro bush, thereby securing various dynamic characteristics.

7 Claims, 8 Drawing Sheets

HYDRO BUSH

CROSS-REFERENCE TO RELATED APPLICATIONS

This application claims priority to and the benefit of Korean Patent Application No. 10-2013-0053352 filed in the Korean Intellectual Property Office on May 10, 2013, the entire contents of which are incorporated herein by reference.

TECHNICAL FIELD

The present invention relates to a hydro bush, and more particularly, to a hydro bush which has a structure that may secure a maximum length of a flow path, and a sufficient size of a liquid chamber, in order to tune dynamic characteristics of the hydro bush.

BACKGROUND ART

In general, a suspension system for a vehicle is an important apparatus for achieving riding quality and running stability, and mainly serves to suppress or quickly reduce vibration transmitted from wheels while stably supporting a vehicle body from the wheels.

A lower arm, which serves to connect and support the wheels to the vehicle body, is used in the suspension system, and a geometry bush is mounted on the lower arm so as to perform very important functions of improving vibration transmission characteristics of the vehicle or riding quality and driving stability of the vehicle by mitigating vibration and impact generated from an uneven road surface.

Recently, a fluid filled type bush is used instead of a general geometry bush that simply includes an outer pipe, an inner pipe, and an insulator.

In this regard, Korean Patent No. 10-0974593 discloses 'Fluid Filled Type Bush'. As illustrated in FIG. 1, the fluid filled type bush includes a damping unit 20 disposed between an outer pipe 3 and a stopper 9 of an insulator 7 in which a flow path is formed, and is characterized by preventing direct contact between the outer pipe 3 and the stopper 9 when excessive impact force occurs when the vehicle moves, reducing impact force, and improving riding quality.

Hereinafter, in describing the fluid filled type bush, names of constituent elements are consistently used in order to clearly describe a difference from a hydro bush according to the present invention.

When describing a hydro bush 2 in the related art with reference to FIGS. 2 to 5, the hydro bush 2 includes an outer pipe 30, an inner pipe 40 which has a plunger 41 that protrudes at one side of an outer circumferential surface of the inner pipe 40, a rubber portion 50, and stoppers 60 which are installed at both side ends of the inner pipe 40. An arrow illustrated in FIG. 5 indicates a flow of a working fluid that flows along flow paths 52.

The rubber portion 50 is installed between the outer pipe 30 and the inner pipe 40 that is installed in the outer pipe 30, and has a liquid chamber 51, and the flow paths 52 that are connected to the liquid chamber 51, as illustrated in FIGS. 3 to 5. Here, the liquid chamber 51 is formed concavely in a circumferential direction of the rubber portion 50, and the interior of the liquid chamber 51 is filled with a working fluid.

The flow paths 52 are formed as grooves in an outer circumferential surface at edges of both side ends of the rubber portion 50 in the circumferential direction, and connected to the liquid chamber 51. Accordingly, the working fluid more stably absorbs impact force, which is transmitted from the vehicle when the vehicle moves, using damping force.

Meanwhile, as important design factors that determine dynamic characteristics of the hydro bush 2, there are a length of the flow path 52 along which the working fluid flows, and a size of the liquid chamber 51.

Therefore, it is difficult to secure a sufficient length of the flow path 52 under a condition in which there is a limit on the size of the hydro bush 2 due to a package restriction of the vehicle, and in a case in which the length of the flow path 52 is increased, the size of the liquid chamber 51 is decreased, and the functions of the hydro bush 2 are restricted.

That is, in a case in which when the rubber portion 50 is designed, the length of the flow path 52 is increased in order to tune dynamic characteristics, while securing the flow paths 52 having predetermined widths at both sides of the rubber portion 50, as illustrated in FIG. 4, there is a problem in that the size of the liquid chamber 51 is reduced.

Accordingly, there is a need for a structure that may secure a maximum length of the flow path 52 and a sufficient size of the liquid chamber 51.

SUMMARY OF THE INVENTION

The present invention has been made in an effort to provide a hydro bush which may secure a maximum length of a flow path and a maximum size of a liquid chamber, and may tune dynamic characteristics.

An exemplary embodiment of the present invention provides a hydro bush which includes an outer pipe, an inner pipe, a rubber portion that is installed between the outer pipe and the inner pipe, and stoppers that are installed at both side ends, the hydro bush including: a liquid chamber which is formed between an inner circumferential surface of the outer pipe and an outer circumferential surface of the rubber portion, and filled with a working fluid; and a flow path which is formed between the inner circumferential surface of the outer pipe and the outer circumferential surface of the rubber portion, and connected to the liquid chamber so as to guide the working fluid when the working fluid flows, in which the flow path includes a protruding portion which is formed to protrude inward.

A plurality of protruding portions may be installed to be spaced apart from each other.

The protruding portions may be installed in a staggered arrangement along the flow path such that the working fluid flowing along the flow path flows in the form of a zigzag.

A cross section of the protruding portion in a direction in which the working fluid flowing along the flow path flows may have any one of triangular, quadrangular, polygonal and semi-circular shapes.

A flow distance and flow velocity of the working fluid may be changed by changing a size of the protruding portion.

The flow path may be formed in a shape of a crawling snake by the protruding portions.

The hydro bush according to the exemplary embodiment of the present invention, which has the aforementioned configurations, includes the protruding portion such that the flow distance of the working fluid flowing along the flow path is increased without increasing the size of the hydro bush, thereby securing various dynamic characteristics.

The flow velocity and the flow distance of the working fluid may be adjusted by changing sizes, shapes, and protruding positions of the protruding portions that are formed in the flow path.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
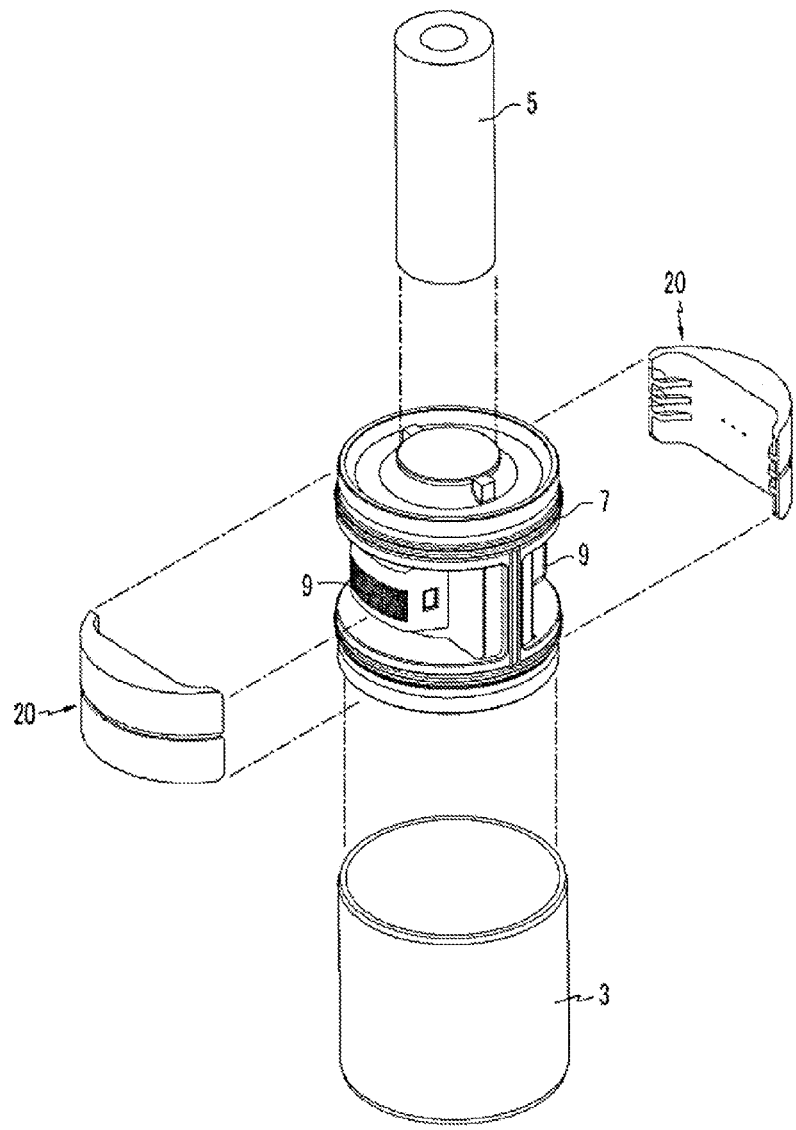
FIG. 1 is an exploded perspective view illustrating a fluid filled type bush illustrated in Korean Patent No. 10-0974593 in the related art.
Figure 2:
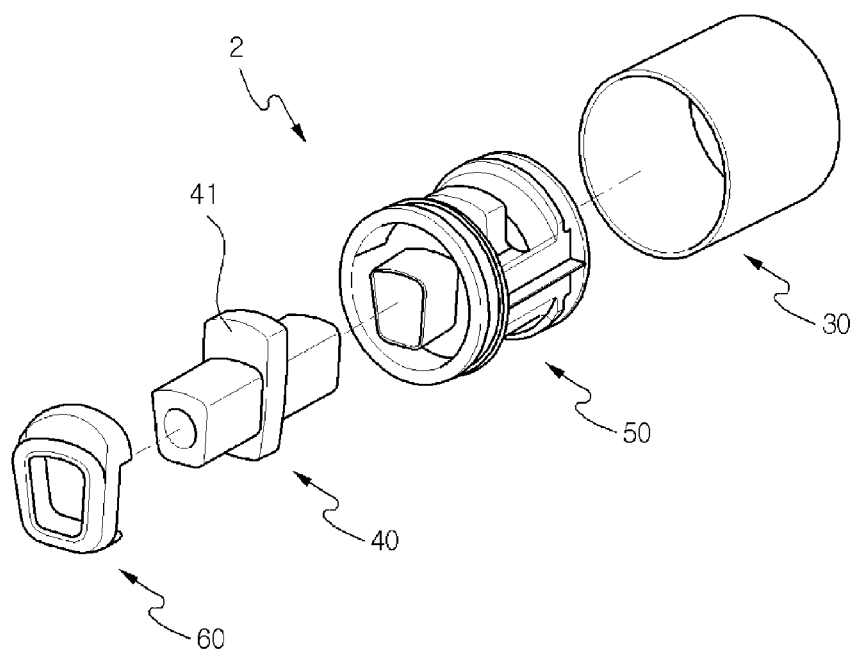
FIG. 2 is an exploded perspective view illustrating the fluid filled type bush in the related art.
Figure 3:
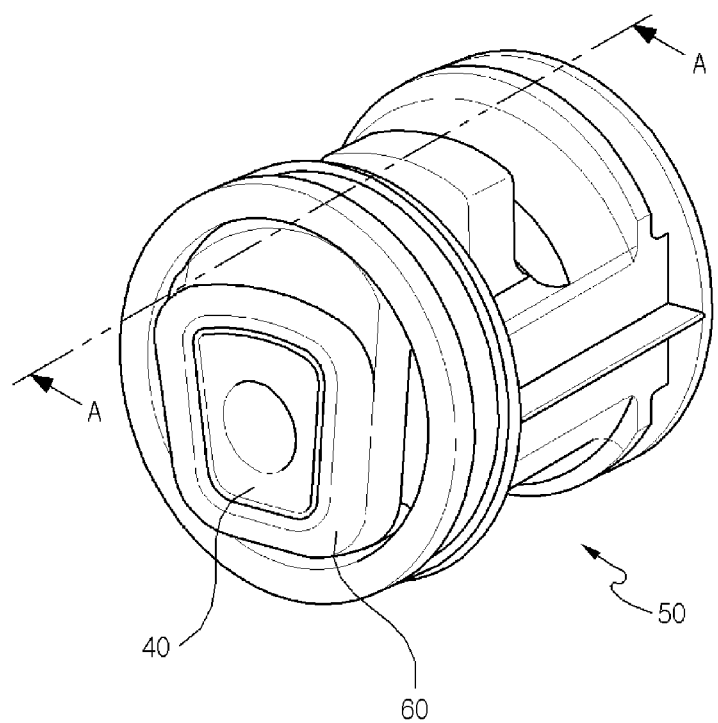
FIG. 3 is a coupled perspective view illustrating the fluid filled type bush in the related art as illustrated in FIG. 2, in which an outer pipe is omitted.
Figure 4:
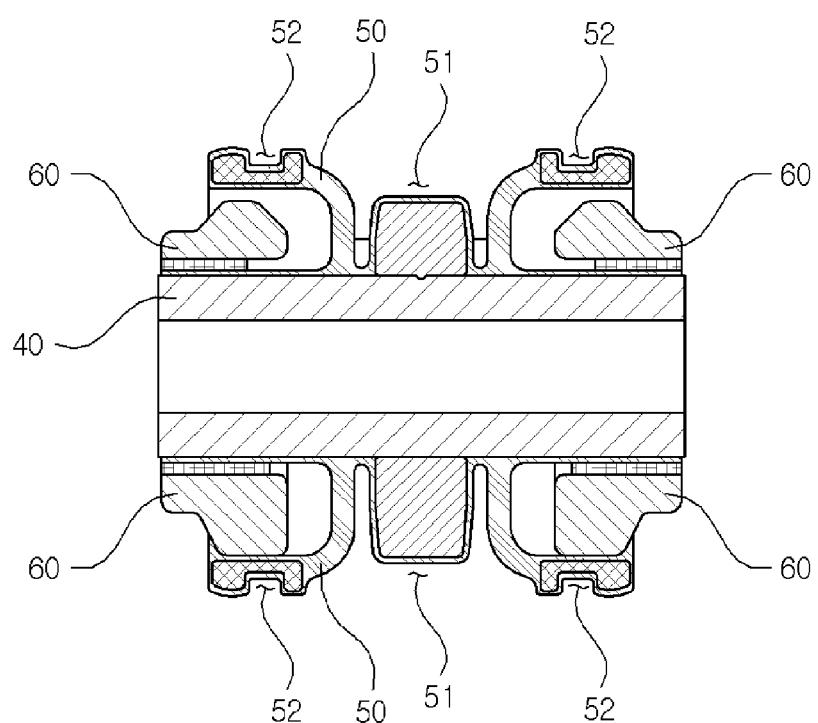
FIG. 4 is a cross-sectional view taken along line A-A of FIG. 3.
Figure 5:
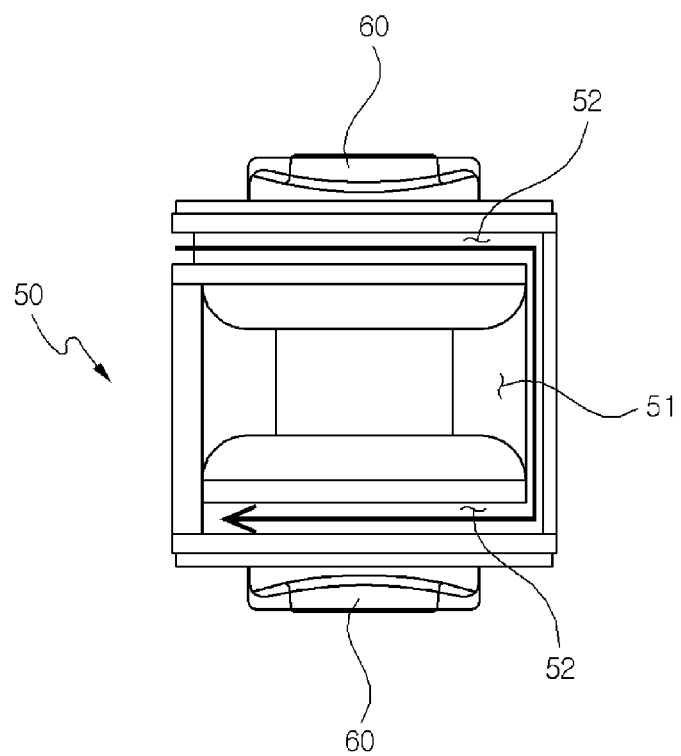
FIG. 5 is a view illustrating a flow of a working fluid on an outer circumferential surface of a rubber portion of the fluid filled type bush in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. The terms used in the following description are defined considering the functions of the present invention and may vary depending on the intention or usual practice of a designer or manufacturer. Therefore, the definitions should be made based on the entire contents of the present specification. Parts indicated by like reference numerals (reference numbers) refer to like elements throughout the specification.

Hereinafter, a hydro bush or hydro bushing 1 according to an exemplary embodiment of the present invention will be described.

Figure 6:
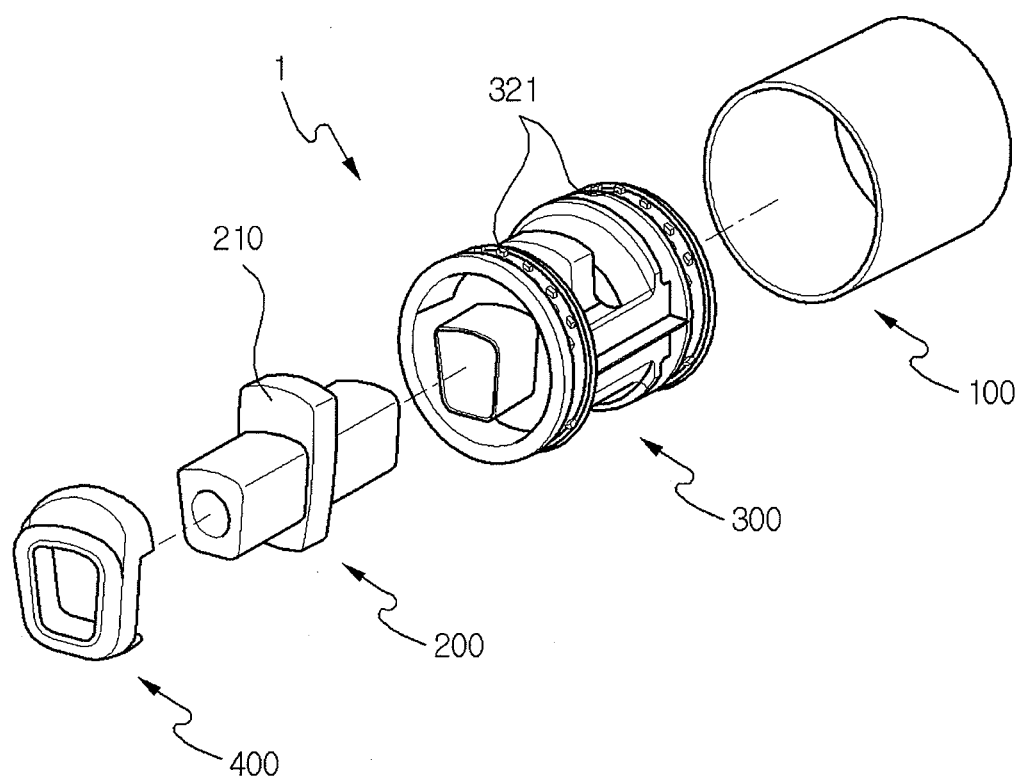
FIG. 6 is an exploded perspective view illustrating a hydro bush according to an exemplary embodiment of the present invention.
Figure 7:
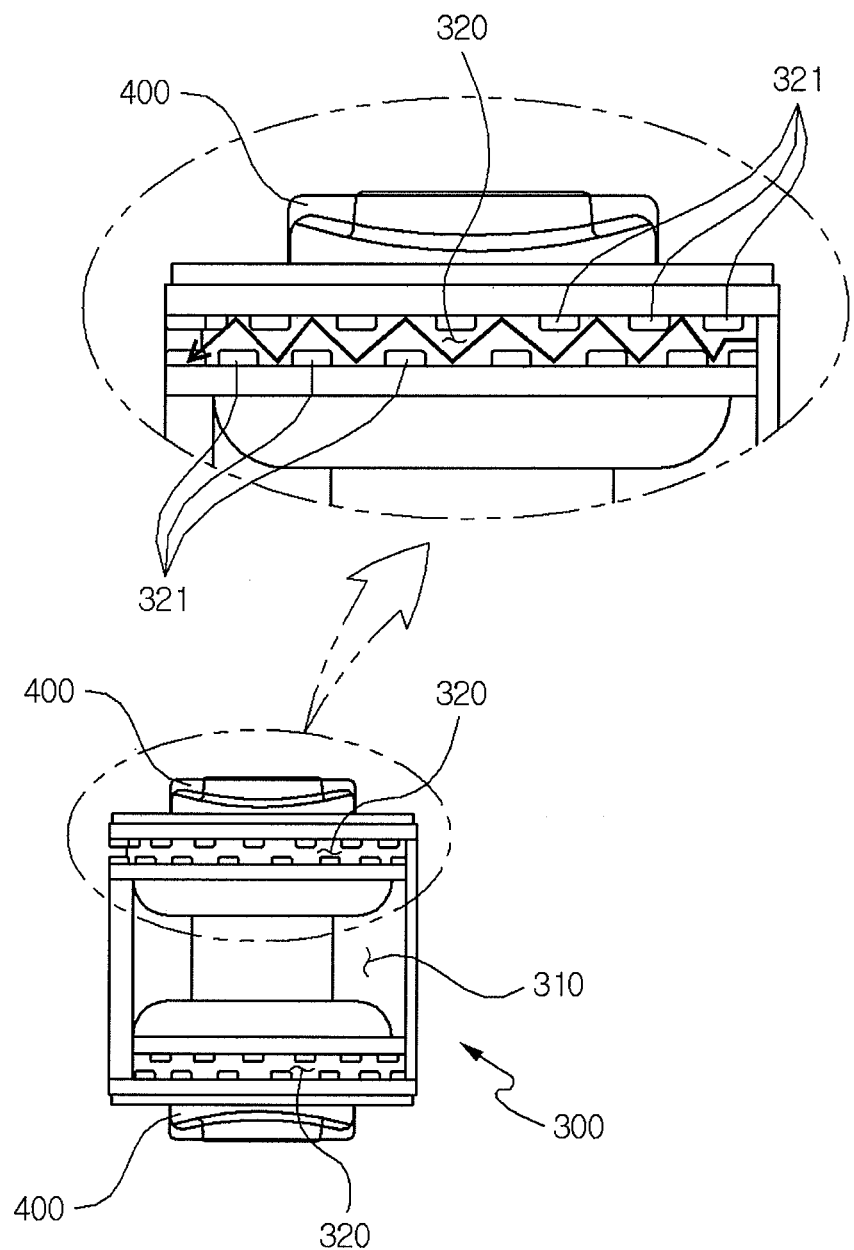
FIGS. 7 and 8 are a view illustrating a flow of a working fluid on an outer circumferential surface of a rubber portion of the hydro bush according to the exemplary embodiment of the present invention.

Referring to FIGS. 6 and 7, the hydro bush 1 includes an outer pipe 100, an inner pipe 200 which has a plunger 210 that protrudes at one side of an outer circumferential surface of the inner pipe 200, a rubber portion or rubber member 300, and stoppers 400 which are installed at both side ends.

That is, the hydro bush 1 according to the exemplary embodiment of the present invention includes the inner pipe 200 which is coupled to the rubber portion 300 in a manner in which the inner pipe 200 penetrates and is fitted with the rubber portion 300, the rubber portion 300 which is coupled to the outer circumferential surface of the inner pipe 200 and has a liquid chamber 310 that is formed in an outer circumferential surface of the rubber portion 300 so as to have a shape opened in a circumferential direction, the outer pipe 100 which is coupled to the outer circumferential surface of the rubber portion 300 in a manner in which the outer pipe 100 seals the liquid chamber 310, and the stoppers 400 which are installed at both side ends of the rubber portion 300 so as to fix the inner pipe 200. Here, an arrow illustrated in FIG. 7 indicates a flow of a working fluid that flows along a fluid path 320.

The rubber portion 300 is installed between the outer pipe 100 and the inner pipe 200 that is installed in the outer pipe 100, and has the liquid chamber 310, and the fluid path 320 that is connected to the liquid chamber 310, as illustrated in FIGS. 6 to 7. Here, the liquid chamber 310 is a space that is formed by the outer circumferential surface of the rubber portion 300, which is formed concavely in the circumferential direction of the rubber portion 300, and by an inner circumferential surface of the outer pipe 100, and the interior of the liquid chamber 310 is filled with the working fluid.

The flow paths or flow channels 320 are formed as grooves in an outer circumferential surface at edges of both side ends of the rubber portion 300 in the circumferential direction, and connected to the liquid chamber 310. Accordingly, the working fluid more stably absorbs impact force, which is transmitted from a vehicle when the vehicle moves, using damping force.

Meanwhile, in the hydro bush 1, a length of the flow path 320 along which the working fluid flows and a size of the liquid chamber 310 are important design factors each that determine dynamic characteristics of the hydro bush 1.

Therefore, in order to secure a sufficient length of the flow path 320 and a sufficient size of the liquid chamber 310 under a condition in which there is a limit on the size of the hydro bush 1 due to a package restriction of the vehicle, the flow path 320 may include a plurality of protruding portions 321 that protrudes inward and provides curved portions of the flow path 320 nearby or around the protruding portions 321.

The protruding portions 321 may be installed in the flow path 320 so as to be spaced apart from each other. The protruding portions 321 are installed in a staggered arrangement along the flow path 320, such that the working fluid flowing along the flow path 320 flows in the form of a zigzag, thereby substantially increasing a flow distance at which the working fluid flows. That is, by the flow path 320 which includes the protruding portions 321 that are installed to be spaced apart from each other in a staggered arrangement, the hydro bush 1 may increase the length of the flow path 320 along which the working fluid flows, while securing the size of the liquid chamber 310.

By the protruding portions 321 that are installed to be spaced apart from each other in the staggered arrangement, a width of the flow path is reduced, whereby flow velocity of the working fluid is changed.

Meanwhile, in order to tune dynamic characteristics by changing flow velocity of the working fluid that flows along the flow path 320, a cross section of the protruding portion 321 may be triangular, quadrangular, or polygonal based on a direction in which the working fluid flows. However, the present invention is not necessarily limited thereto, but the protruding portion, of course, may be formed to protrude in a semi-circular shape in some cases.

Sizes of the protruding portions 321 may be different from each other. Therefore, by changing the sizes of the protruding portions 321, the flow distance and the flow velocity of the working fluid may be changed.

Collectively, in the hydro bush 1 according to the exemplary embodiment of the present invention, the flow velocity and the flow distance of the working fluid may be adjusted by changing sizes, shapes, and protruding positions of the protruding portions 321 that are formed in the flow path 320.

Figure 8:
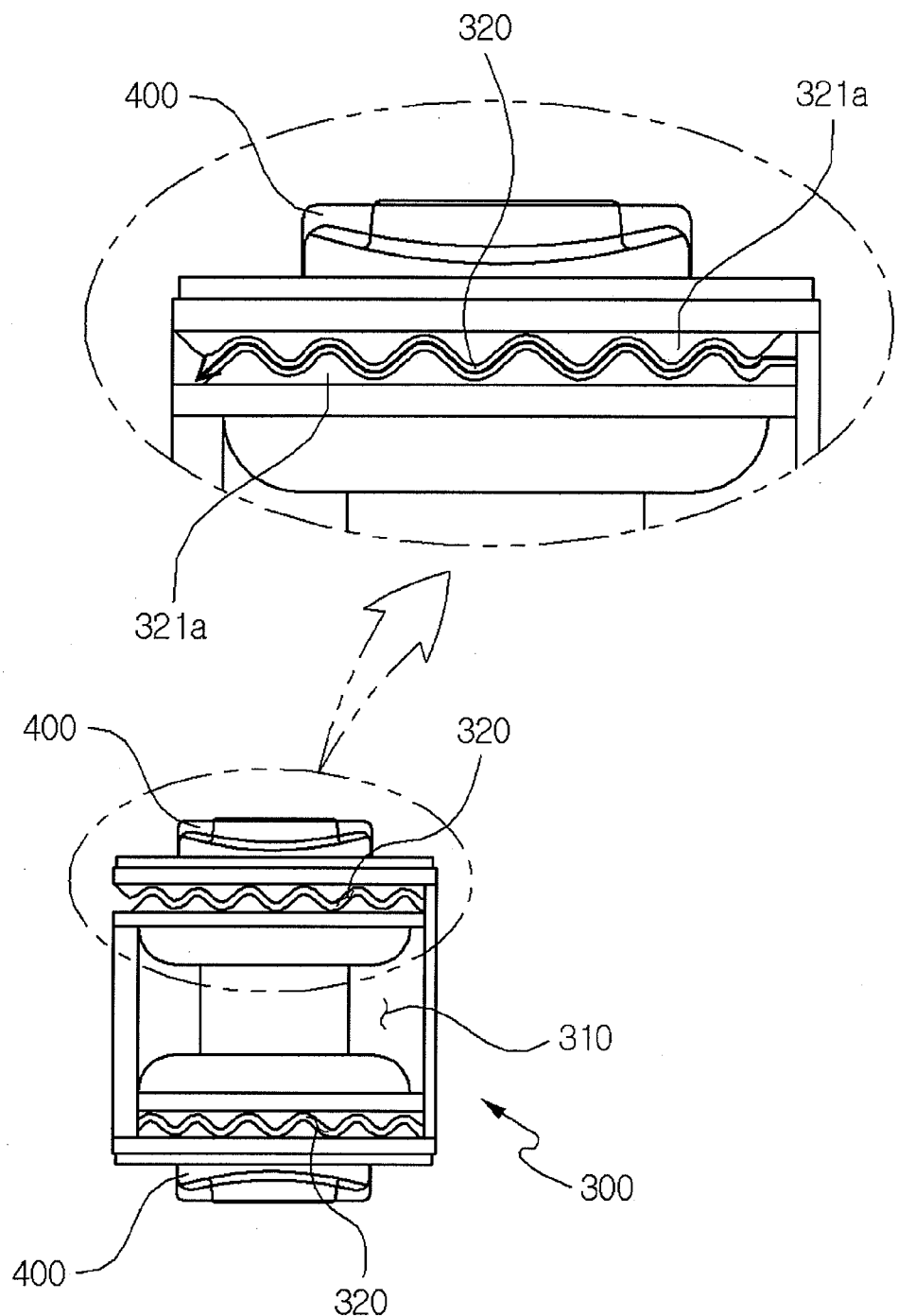

Meanwhile, as illustrated in FIG. 8, protruding portions 321a continuously protrude so that heights of the protruding portions 321a, which protrude inward in the flow path 320, are different from each other for each region, thereby forming the flow path 320 in a meandering shape like a shape of a crawling snake. That is, a cross section of the protruding portion 321a may be formed in a waveform based on a direction in which the working fluid flows.

Therefore, the protruding portion 321a may reduce a turbulent flow that is formed in a flow of the working fluid that flows along the flow path 320.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A hydro bush comprising:
   an outer pipe comprising an inner surface;
   an inner piece arranged inside the outer pipe;
   a rubber piece comprising a first rim portion, a second rim portion and a middle portion arranged along a central axis such that the middle portion is interposed between the first and second rim portions;
   the rubber piece fitted between the outer pipe and the inner piece such that each of the first and second rim portions contacts the outer pipe and that a liquid chamber is formed between the middle portion of the rubber piece and the inner surface of the outer pipe and further between the first and second rim portions; and
   the first rim portion comprising two opposing bands formed on its outer circumference such that the two opposing bands contact the inner surface of the outer pipe and define a first flow path between the inner surface of the outer pipe and the first rim portion and further between the two opposing bands of the first rim portion;
   the first rim portion further comprising a plurality of protrusions protruding from each of the two opposing bands toward the other of the two opposing bands such that the first flow path undulates as it extends in a circumferential direction perpendicular to the central axis;
   the second rim portion comprising two opposing bands formed on its outer circumference such that the two opposing bands contact the inner surface of the outer pipe and define a second flow path between the inner surface of the outer pipe and the second rim portion and further between the two opposing bands of the second rim portion; and
   the second rim portion further comprising a plurality of protrusions protruding from each of the two opposing bands toward the other of the two opposing bands such that the second flow path undulates as it extends in the circumferential direction.

2. The hydro bush of claim 1, wherein the plurality of protrusions of the first rim portion are alternating along the first flow path such that one protrusion protrudes from one of the two opposing bands and an immediately next protrusion in the circumferential direction is from the other of the two opposing bands.

3. The hydro bush of claim 1, wherein the plurality of protrusions of the first rim portion are installed in a staggering arrangement along the circumferential direction.

4. The hydro bush of claim 3, wherein a cross-section of the plurality of protrusions of the first rim portion are in any one of triangular, quadrangular, polygonal and semi-circular shapes when the cross-section is taken in a plane perpendicular to a radial direction about the central axis.

5. The hydro bush of claim 2, wherein the plurality of protrusions of the second rim portion are alternating along the second flow path such that one protrusion protrudes from one of the two opposing bands and an immediately next protrusion in the circumferential direction is from the other of the two opposing bands.

6. The hydro bush of claim 3, wherein the plurality of protrusions of the second rim portion are installed in a staggering arrangement along the circumferential direction.

7. The hydro bush of claim 6, wherein a cross-section of the plurality of protrusions of the second rim portion are in any one of triangular, quadrangular, polygonal and semi-circular shapes when the cross-section is taken in a plane perpendicular to a radial direction about the central axis.

* * * * *